Figures 1, 2:
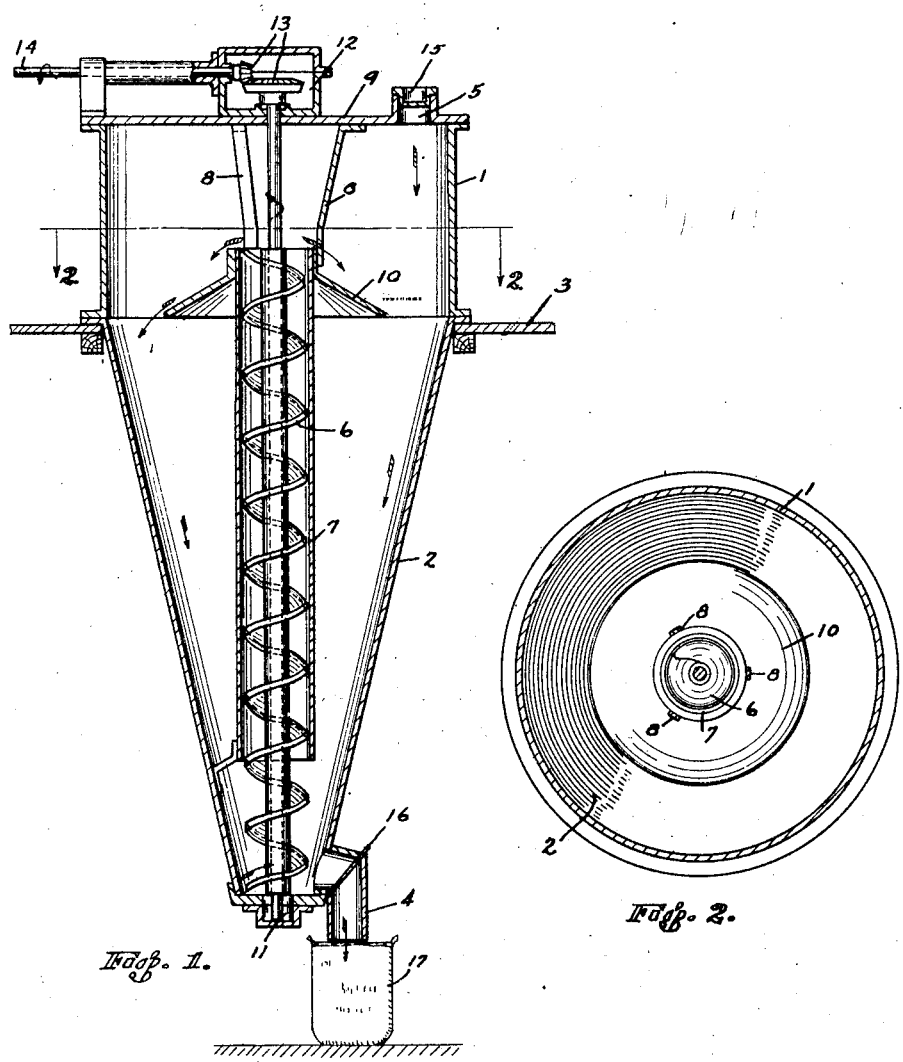

Sept. 17, 1929.  O. O. HOWARD  1,728,411

MIXER

Filed Sept. 6, 1927

INVENTOR
O. O. HOWARD.
BY
ATTORNEYS.

Patented Sept. 17, 1929

1,728,411

UNITED STATES PATENT OFFICE

OLIVER O. HOWARD, OF YAMHILL, OREGON

MIXER

Application filed September 6, 1927. Serial No. 217,696.

My invention relates to improvements in mixers, and it consists in the combinations, constructions and arrangements hereinafter described and claimed.

An object of my invention is to provide a mixer for grain and the like, which will cause a circulation of the grain throughout the entire body thereof until the latter has been thoroughly mixed, the means for accomplishing this including novel means for acting upon all portions of the grain within the device.

A further object of my invention is to provide a device of the type described, which has a casing of novel shape for thinning out the grain at the bottom of the casing, and for causing all of the grain to flow from the top to the bottom of the casing, and then to be conveyed back to the top for repeating the operation.

Other objects and advantages will appear in the following specification, and the novel features of my invention will be particularly pointed out in the appended claims.

My invention is illustrated in the accompanying drawing forming a part of this application, in which Figure 1 is a vertical section through the device; and Figure 2 is a section along the line 2—2 of Figure 1.

In carrying out my invention I provide a casing 1 having a conical-shaped lower portion 2. This casing is supported by a platform 3 and has an outlet opening 4 at the bottom thereof and an inlet opening 5 at the top thereof.

Centrally disposed in the casing is a screw conveyor 6, which is housed for a portion of its length by a sleeve 7. The sleeve is carried by bars 8, the latter being connected to a cover 9. It will also be noted from Figure 1 that a deflecting conical-shaped plate 10 is carried by the sleeve 7 and is secured to the sleeve at the upper end thereof.

As heretofore stated, the sleeve 7 terminates a short distance from the bottom of the conical-shaped member 2 and therefore exposes a part of the conveyer 6 so that the latter can lift the grain from the bottom of the container to the top of the sleeve, at which point the grain is split over the deflector 10.

The conveyor belt 6 has its lower end mounted in a bearing 11 and its upper end mounted in a casing 12, the casing also housing bevelled gears 13, which connect the conveyer to a drive shaft 14.

From the foregoing description of the various parts of the device, the operation thereof will be readily understood.

A cap 15 is removed from the opening 5 when it is desired to fill the container with grain, or other material which is to be mixed. After the desired amount of grain has been poured into the container, the conveyer 6 is rotated and will lift the grain in the manner already described. It is obvious that a constant circulation of the grain within the container will thoroughly mix the different kinds of grain. The conical-shaped portion 2 materially aids in this operation, because it thins out the body of grain and thus causes all of the grain to be worked upon by the conveyer 6.

After the grain has been mixed to the desired extent, a cut off slide 16 is moved for opening the outlet 4, which permits the grain to flow into a sack 17, or other container. The device is extremely simple in construction and is durable and efficient for the purpose intended.

Although I have shown and described one embodiment of my invention, it is to be understood that the same is susceptible of various changes and I reserve the right to employ such changes as may come within the scope of the appended claims.

I claim:

1. A mixer comprising a casing having a cylindrical portion and a conically-shaped portion, the latter being much longer than the former, a screw conveyor extending from the bottom of said casing to a position slightly above the top of the conical portion, a sleeve housing said screw from the top to a short space from the bottom, a deflector plate carried by the top of said sleeve and having its bottom edge lying in the same plane as the top of the conical portion, and means for actuating said screw.

2. A mixer comprising a casing having a conical-shaped portion, the inner surface thereof extending at a gradual inclination with respect to the longitudinal axis of said casing, a screw conveyor extending from the bottom of said casing to a position slightly above said conical-shaped portion, a sleeve housing said screw from the top to a short distance from the bottom, a deflector secured to the top of said sleeve and having its bottom edge lying in the same plane as the top of the conical portion, and means for actuating said screw.

OLIVER O. HOWARD.